(12) United States Patent
Chen et al.

(10) Patent No.: US 7,983,000 B2
(45) Date of Patent: Jul. 19, 2011

(54) REMOVABLE DISK DRIVE MOUNTING DEVICE INCLUDING A FIRST HOLDER PIVOTALLY CONNECTED TO SECOND HOLDERS WHICH IN TURN ARE DETACHABLY CONNECTED TO A HANDLE

(75) Inventors: Chih-Pin Chen, Taipei (TW); Te-Sheng Liu, Taichung (TW); Kuo-Kuang Liu, Nantou County (TW); Shin-Hsun Yang, Taipei (TW)

(73) Assignee: Universal Scientific Industrial Co., Ltd., Nau Tou (TW)

( * ) Notice: Subject to any disclaimer, the term of this patent is extended or adjusted under 35 U.S.C. 154(b) by 637 days.

(21) Appl. No.: 12/131,966

(22) Filed: Jun. 3, 2008

(65) Prior Publication Data

US 2009/0154006 A1 Jun. 18, 2009

(30) Foreign Application Priority Data

Dec. 18, 2007 (TW) ................................ 96221550 U

(51) Int. Cl.
*G11B 5/012* (2006.01)

(52) U.S. Cl. .................................. 360/97.01; 360/97.02
(58) Field of Classification Search ..... 360/97.01–99.12
See application file for complete search history.

(56) References Cited

U.S. PATENT DOCUMENTS 5,212,681 A * 5/1993 Bock et al. ..................... 720/654
6,130,817 A * 10/2000 Flotho et al. ............. 361/679.31

* cited by examiner

Primary Examiner — A. J. Heinz
(74) Attorney, Agent, or Firm — Browdy & Neimark, PLLC

(57) ABSTRACT

A removable hard disk device includes a handle, a first holder, a hard disk drive located between the handle and the first holder, and two second holders pivotally connected to ends of the first holder and detachably connected to ends of the handle with the two second holders firmly holding the hard disk drive there between and detachably connected to the disk drive. When the second holders are forced to pivotally move outwardly relative to each other, the second holders will be separated from the first holder and the handle such that the hard disk drive can be dismounted from the first holder without using any tool.

7 Claims, 5 Drawing Sheets

REMOVABLE DISK DRIVE MOUNTING DEVICE INCLUDING A FIRST HOLDER PIVOTALLY CONNECTED TO SECOND HOLDERS WHICH IN TURN ARE DETACHABLY CONNECTED TO A HANDLE

BACKGROUND OF THE INVENTION

1. Field of the Invention

The present invention relates generally to a hard disk drive, and more specifically to a removable hard disk device including holding means that can be mounted with and dismounted from a hard disk drive conveniently.

2. Description of the Related Art

A conventional removable hard disk drive is screwed to a hard disk box that is detachably mounted in a computer case, such that the hard disk drive and the hard disk box have to be taken out of the computer case together if the hard disk drive needs to be removed out of the computer case.

When the hard disk drive needs to be repaired or replaced, a maintenance worker has to use a screwdriver to remove screws one by one so as to dismount the hard disk drive from the hard disk box. After the repair or replace work of the hard disk drive is completed, the maintenance worker must place the hard disk drive in position inside the hard disk box and tighten the screws one by one again to fasten the hard disk drive to the hard disk box. It can be seen that the hard disk drive and the hard disk box are inconvenient in assembly and disassembly works, thereby adversely influence the efficiency of repair or replace work of the hard disk drive.

SUMMARY OF THE INVENTION

The present invention has been accomplished in view of the above-noted circumstances. It is one objective of the present invention to provide a removable hard disk device, which is convenient in its assembly and disassembly works, such that the efficiency of repair or replacement work of the hard disk drive can be enhanced.

To achieve this objective of the present invention, the removable hard disk device comprises a handle, a first holder, a hard disk drive located between the handle and the first holder, and two second holders each having an end pivotally connected to one of two ends of the first holder, and the other end detachably engaged with one of two ends of the handle. The second holders each have a side detachably connected to a one of two opposite sides of the hard disk drive, such that the hard drive can be firmly held by the first holder, the second holders and the handle.

Accordingly, if a maintenance worker forces the two second holders to pivotally move outwardly, the two second holders can be respectively separated from the handle and the hard disk drive, such that the hard disk drive can be dismounted from the first holder and the handle for enabling the repair or replacement work of the hard disk drive.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
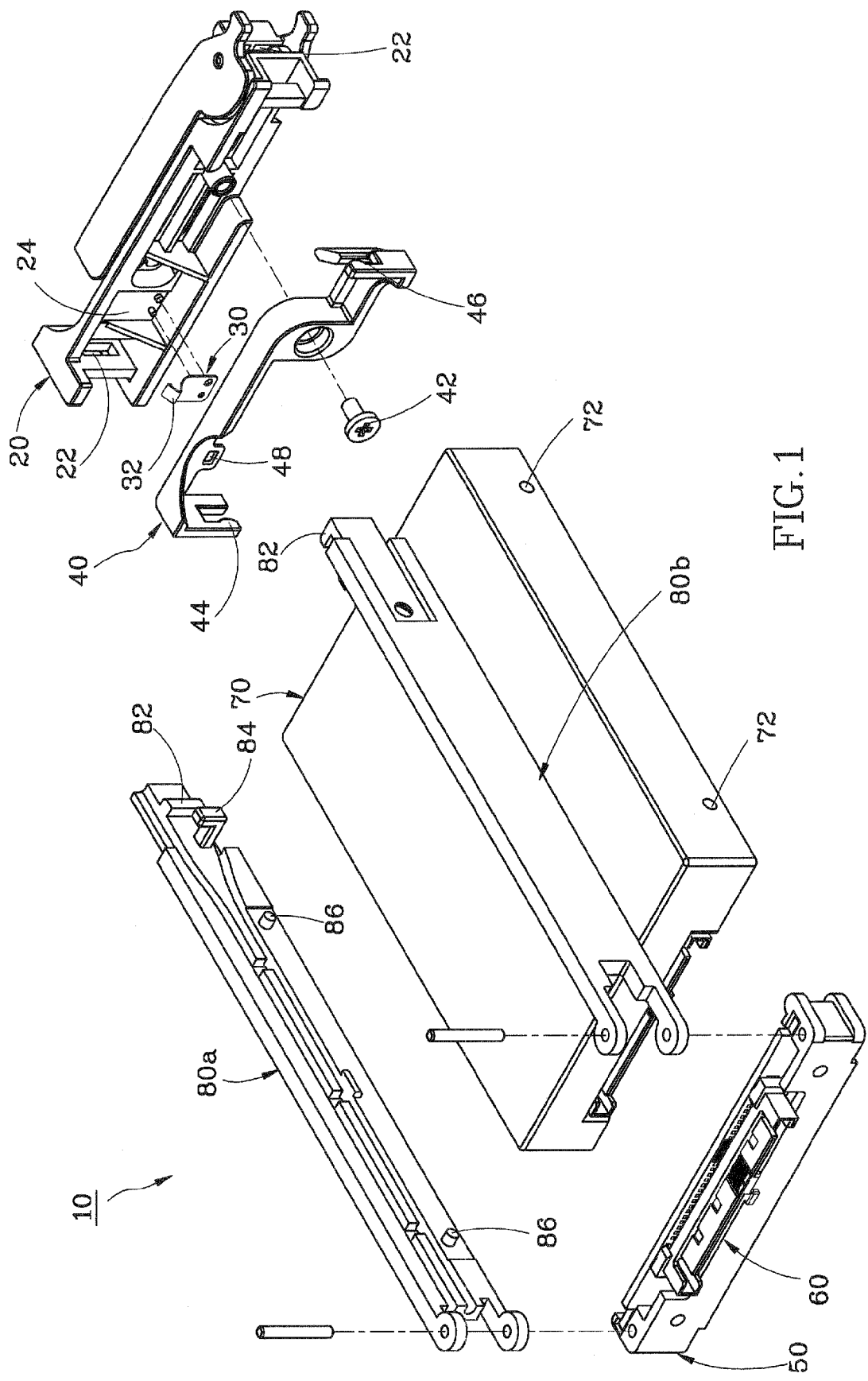
FIG. 1 is an exploded view of the removable hard disk device according to a preferred embodiment of the present invention.

As shown in FIG. 1, a removable hard disk device 10 in accordance with a preferred embodiment of the present invention comprises a handle 20, a positioning member 30, a hook member 40, a first holder 50, a circuit board 60, a hard disk drive 70, and a pair of second holders 80a and 80b.

The handle 20 has an insertion groove 22 at each of left and right ends thereof and a retaining portion 24 located in proximity of the left insertion groove 22.

The positioning member 30, which is made of elastic materials, is mounted to the retaining portion 24 of the handle 20 and provided at a top end thereof with a positioning portion 32.

The hook member 40 is pivotally connected to the handle 20 by a pivot 42 and has first hook portions 44 and 46 at two ends thereof respectively. The hook portion 44 has an opening facing downward but the hook portion 46 has an opening facing upward. Further, the hook member 40 has a positioning hole 48 for engagement with the positioning portion 32 of the positioning member 30 such that the hook member 40 will not be moved pivotally relative to the handle 20 randomly.

The first holder 50 is spaced from the handle 20 at a distance.

The circuit board 60 is mounted with the first holder 50.

The hard disk drive 70 is electrically connected to the circuit board 60 so as to be located between the first holder 50 and the handle 20. The hard disk drive 70 is provided at each of left and right sides thereof with two holes 72.

The second holders 80a and 80b each have an end pivotally connected to one of the left and right ends of the first holder 50 and the other end provided with an insertion block 82 insertable into one of the insertion grooves 22 of the handle 20 for coupling the second holders 80a and 80b and the handle 20 together, and a second hook portion 84 engageable with one of the first hook portions 44 and 46 of the hook member 40 for coupling the second holders 80a and 80b and the hook member 40 together. Further, the second holders 80a and 80b each have two protrusions 86 provided at one side that faces the hard disk drive 70 for respectively inserting into the holes 72 of the hard disk drive 70 so as to couple the second holders 80a and 80b and the hard disk drive 70 together.

Figure 2:
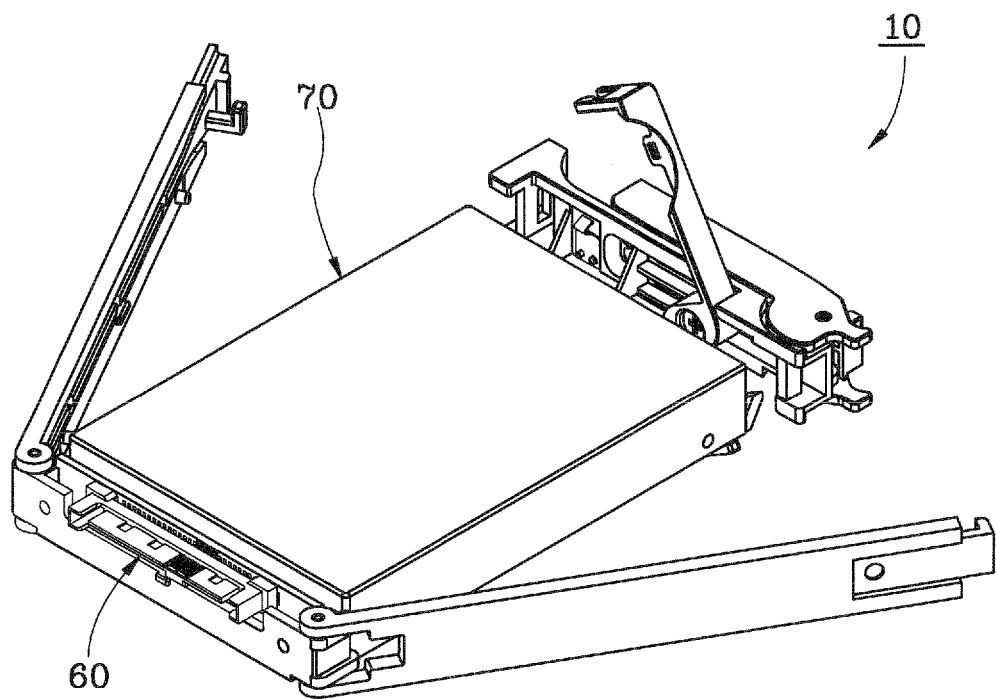
FIG. 2 is a partial assembled perspective view of the removable hard disk device according to the preferred embodiment of the present invention, showing the hard disk drive is electrically connected to a circuit board.
Figure 3:
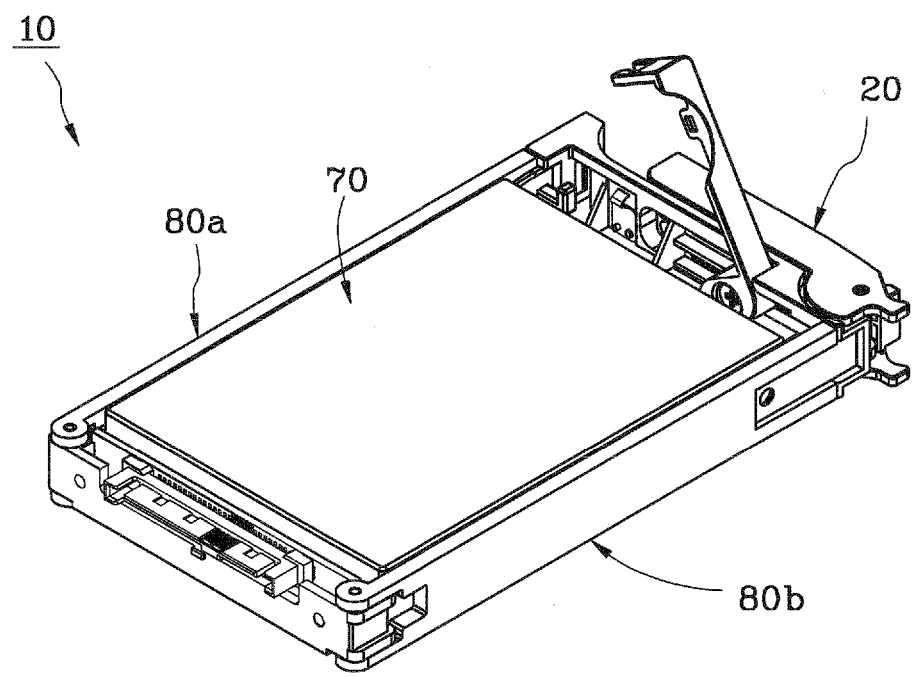
FIG. 3 is another partial assembled perspective view of the removable hard disk device according to the preferred embodiment of the present invention, showing the second holders are connected to the handle and the hard disk drive.
Figure 4:
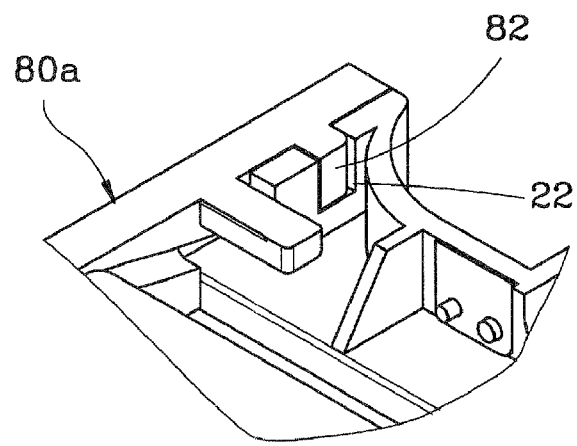
FIG. 4 is an enlarged view of a part of the removable hard disk device according to the preferred embodiment of the present invention, showing an insertion block of one of the second holders is inserted into one of the insertion grooves of the handle.
Figure 5:
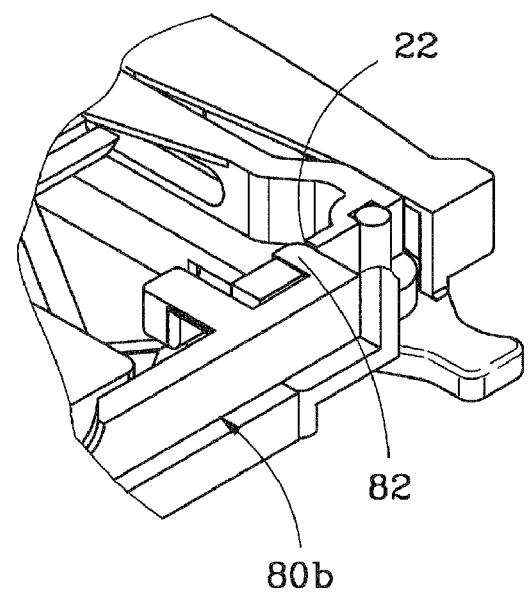
FIG. 5 is another enlarged view of a part of the removable hard disk device, showing the insertion block of the other one of the second holders is inserted into the other one of the insertion grooves of the handle.
Figure 6:
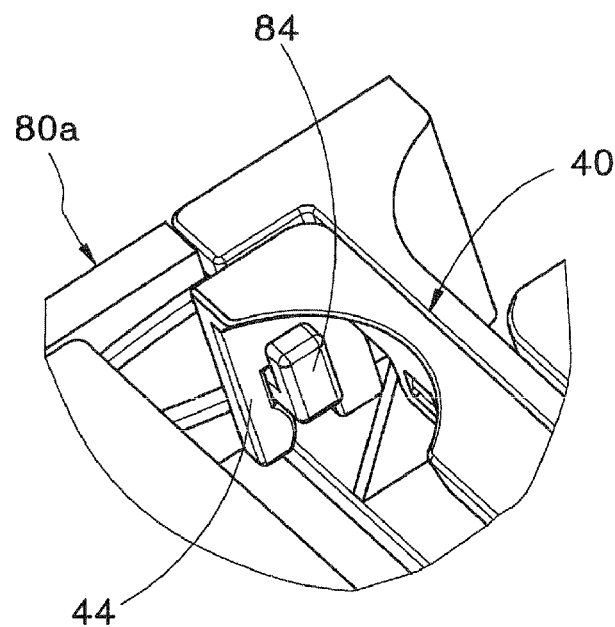
FIG. 6 is still another enlarged view of a part of the removable hard disk device, showing one of the two first hook portions of the hook member is engaged with the second hook portion of one of the two second holders.
Figure 7:
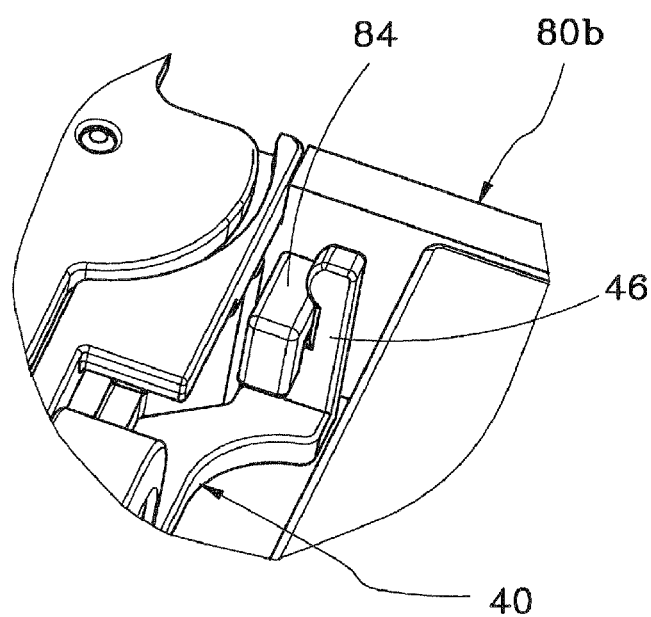
FIG. 7 is still another view of a part of the removable hard disk device, showing the other one of two first hook portions of the hook member is engaged with the second hook portion of the other one of the two second holders.
Figure 8:
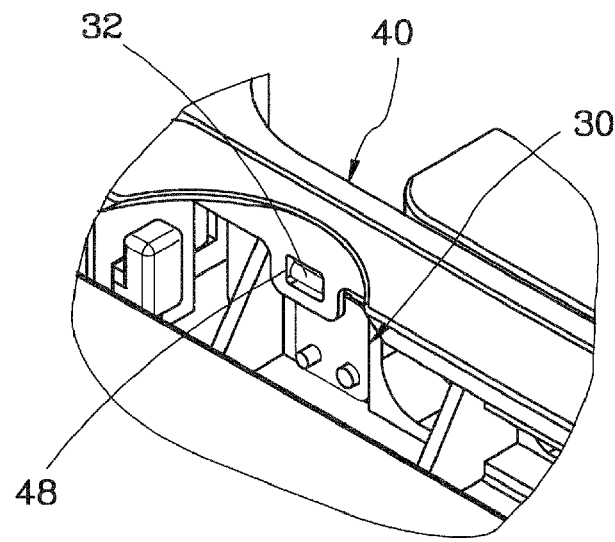
FIG. 8 is still another enlarged view of a part of the removable hard disk device, showing a positioning portion of a positioning member is engaged with a positioning hole of the hook member.
Figure 9:
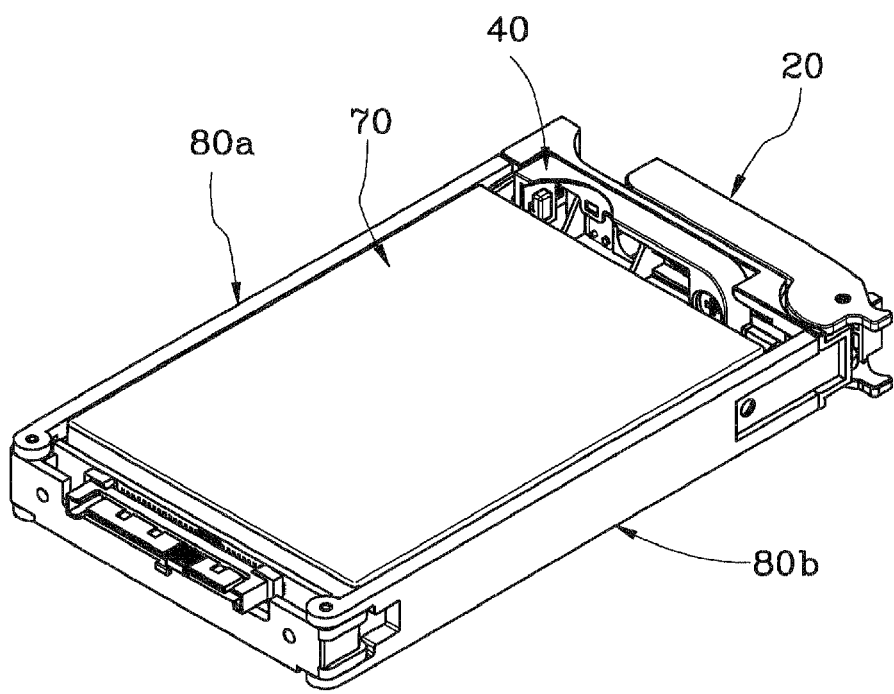
FIG. 9 is a perspective view of the removable hard disk device in an assembled manner according to a preferred embodiment of the present invention.

By means of the aforesaid design, when assembling the removable hard disk device 10 of the present invention, a maintenance worker can abut the hard disk drive 70 and the first holder 50 together to electrically connect the hard disk drive 70 to the circuit board 60 first, as shown in FIG. 2, and then force the second holders 80a and 80b to pivotally move toward the hard disk drive 70 so as to have the insertion blocks 82 of the second holders 80a and 80b be inserted into the insertion grooves 22 of the handle 20 and the protrusions 86 of the second holders 80a and 80b be inserted into the holes 72 of the hard disk drive 70, as shown in FIGS. 3 to 5, thereby coupling the hard disk drive 70, the second holders 80a and 80b, and the handle 20 together. Next, the maintenance worker can press the hook member 40 to move pivotally until the positioning portion 32 of the positioning member 30 is engaged with the positioning hole 48 of the hook member 40, as shown in FIG. 8. At this time, the first hook portion 44 of the hook member 40 is engaged with the second hook portion 84 of the second holder 80a, as shown in FIG. 6, and the first hook portion 46 of the hook member 40 is engaged with the second hook portion 84 of the second holder 80b, as shown in FIG. 7, such that the second holders 80a and 80b can be securely coupled to the hard disk drive 70 and the handle 20. FIG. 9 illustrates the final assembled manner of the hard disk device 10 of the present invention. As illustrated, the assembly work of the removable hard disk device 10 can be completely done easily without using any tool.

On the contrary, when disassembling the hard disk drive 70, the maintenance worker can pull the hook member 40 to force the positioning portion 32 of the positioning member 30 to be disengaged from the positioning hole 48 of the hook member 40, and then pivotally move the hook member 40 for enabling the first hook portions 44 and 46 of the hook member 40 to be disengaged from the second hook portions 84 of the second holders 80a and 80b. And then, the maintenance worker can pull the second holders 80a and 80b to pivotally move outwardly relative to each other such that the insertion blocks 82 and the protrusions 86 of the second holders 80a and 80b can be respectively pulled out of the insertion grooves 22 of the handle 20 and the holes 72 of the hard disk drive 70 for enabling the dismounting work of the hard disk drive 70 from the circuit board 60.

In conclusion, the removable hard disk device of the present invention can be assembled and disassembled without using any tool for enhancing convenience of its assembly work and the repair or replacement work of the hard disk drive.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A removable hard disk device comprising:
a handle;
a first holder;
a hard disk drive located between the handle and the first holder; and
two second holders each having an end pivotally connected to one of two opposite ends of the first holder, the other end detachably engaged with one of two opposite ends of the handle, and a side detachably connected to one of two opposite sides of the hard disk drive.

2. The removable hard disk device as claimed in claim 1, wherein the handle is provided at each one of the two opposite ends thereof with an insertion groove, and each said second holder is provided at the end remote from the first holder with an insertion block inserted into the insertion groove.

3. The removable hard disk device as claimed in claim 1, wherein the two opposite sides of the hard disk drive each have at least one hole, and the side of each said second holder has at least one protrusion inserted into the hole.

4. The removable hard disk device as claimed in claim 1, further comprising a hook member pivotally connected to the handle and located between the handle and the hard disk drive; said hook member having two ends respectively detachably connected to the ends of the second holders that are detachably and respectively engaged with the two opposite ends of the handle.

5. The removable hard disk device as claimed in claim 4, wherein the two ends of the hook member each have a first hook portion and the ends of the second holders that are detachably and respectively engaged with the two opposite ends of the handle each have a second hook portion detachably engaged with the first hook portion.

6. The removable hard disk device as claimed in claim 4, further comprising a positioning member provided at the handle and having a positioning portion detachably engaged with a positioning hole of the hook member.

7. The removable hard disk device as claimed in claim 1, further comprising a circuit board mounted on the first holder and electrically connected to the hard disk drive.

* * * * *